(12) United States Patent
Jones et al.

(10) Patent No.: US 8,788,346 B2
(45) Date of Patent: Jul. 22, 2014

(54) DYNAMIC IN-PAGE ADVERTISING

(71) Applicant: Yahoo! Inc., Sunnyvale, CA (US)

(72) Inventors: M. Cameron Jones, Seattle, WA (US); Elizabeth F. Churchill, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 13/755,722

(22) Filed: Jan. 31, 2013

(65) Prior Publication Data

US 2013/0144729 A1   Jun. 6, 2013

Related U.S. Application Data

(63) Continuation of application No. 13/436,307, filed on Mar. 30, 2012, now Pat. No. 8,392,257, which is a continuation of application No. 12/262,497, filed on Oct. 31, 2008, now Pat. No. 8,175,922.

(51) Int. Cl.
*G06Q 30/00* (2012.01)
*G06F 3/048* (2013.01)
*G06F 17/24* (2006.01)

(52) U.S. Cl.
USPC .................. 705/14.73; 715/810; 715/202

(58) Field of Classification Search
USPC .................................................. 715/202, 810
See application file for complete search history.

(56) References Cited

U.S. PATENT DOCUMENTS

| | | | |
|---|---|---|---|
| 8,175,922 B2 | 5/2012 | Jones et al. | |
| 2003/0229542 A1 | 12/2003 | Morrisroe et al. | |
| 2004/0148342 A1 | 7/2004 | Cotte | |
| 2005/0091111 A1 | 4/2005 | Green et al. | |
| 2006/0010199 A1 | 1/2006 | Brailean et al. | |
| 2006/0085263 A1 | 4/2006 | Greer et al. | |

(Continued)

FOREIGN PATENT DOCUMENTS

| | | |
|---|---|---|
| CN | 101004739A A | 7/2007 |
| CN | 101030283 A | 9/2007 |

(Continued)

OTHER PUBLICATIONS

International Search Report and Written Opinion received for PCT Patent Application No. PCT/US2009/060170, mailed on May 19, 2010, 11 pages.

(Continued)

*Primary Examiner* — John G Weiss
*Assistant Examiner* — Marilyn G Macasiano
(74) *Attorney, Agent, or Firm* — James J. Decarlo; Greenberg Traurig, LLP

(57) ABSTRACT

Advertisements displayed in a web page are enabled to be changed as a context of the web page changes without reloading the web page. A first set of one or more advertisements may be displayed on a web page. One or more of the displayed advertisements may be replaced with one or more alternative advertisements. Selection of the alternative advertisements is triggered based on the occurrence of one or more events that cause a change in a context of the web page. The display of the alternative advertisements is performed dynamically, without the web page needing to be reloaded. In this manner, the advertisements displayed on a web page may be changed based on the change in web page context, to provide advertisements to users that correspond to the changing context.

20 Claims, 13 Drawing Sheets

(56) References Cited

U.S. PATENT DOCUMENTS

| | | | |
|---|---|---|---|
| 2006/0271425 A1 | 11/2006 | Goodman et al. | |
| 2006/0287912 A1 | 12/2006 | Raghuvamshi | |
| 2007/0143264 A1 | 6/2007 | Szeto | |
| 2008/0307317 A1 | 12/2008 | Yohai-Giochais | |
| 2009/0044147 A1* | 2/2009 | Alringer | 715/810 |
| 2009/0055770 A1 | 2/2009 | King et al. | |
| 2009/0089151 A1 | 4/2009 | Protheroe et al. | |
| 2009/0319648 A1 | 12/2009 | Dutta et al. | |
| 2010/0114720 A1 | 5/2010 | Jones et al. | |
| 2010/0138271 A1 | 6/2010 | Henkin et al. | |
| 2010/0138451 A1 | 6/2010 | Henkin et al. | |
| 2010/0138452 A1 | 6/2010 | Henkin et al. | |
| 2010/0198697 A1 | 8/2010 | Brown et al. | |
| 2011/0154173 A1* | 6/2011 | Herlein | 715/202 |
| 2012/0185343 A1 | 7/2012 | Jones et al. | |

FOREIGN PATENT DOCUMENTS

| | | |
|---|---|---|
| CN | 101030283A A | 9/2007 |
| KR | 10-2008-0053692 A | 6/2008 |
| WO | 2007/123760 A2 | 11/2007 |
| WO | 2010/051152 A2 | 5/2010 |
| WO | 2010/051152 A3 | 7/2010 |

OTHER PUBLICATIONS

Office Action Received for Chinese Patent Application No. 2009801424944, mailed on Jun. 4, 2012, 8 pages of Chinese Office action and 14 Pages of English translation.

Supplementary European Search Report dated Aug. 29, 2013; 2 pages.

* cited by examiner

DYNAMIC IN-PAGE ADVERTISING

This application is a continuation of U.S. application Ser. No. 13/436,307, filed on Mar. 30, 2012, now allowed, which is a continuation of U.S. application Ser. No. 12/262,497, filed on Oct. 31, 2008, now U.S. Pat. No. 8,175,922, both of which are incorporated by reference herein in their entireties.

BACKGROUND OF THE INVENTION

1. Field of the Invention

The present invention relates to the selection of advertisements for display in online web pages.

2. Background

According to one definition, advertising is a paid, one-way communication through a medium in which an advertiser is identified, and the message (i.e., the advertisement) provided by the advertiser is controlled. Advertising may be performed for a variety of purposes, including publicity, public relations, product placement, sponsorship, underwriting, and sales promotion. A variety of mediums are used to convey an advertisement, including television, radio, movies, magazines, newspapers, the Internet, and billboards.

Online Advertising relates to the promoting of products and services using the Internet and World Wide Web. Typical online advertisement types include banner ads, floating ads, pop-up ads, and video ads which are provided through a browser to the user's computer desktop. "Contextual advertising" refers to a form of Internet advertising/marketing where advertisements are selected and served by automated systems based on content displayed to the user. For example, a contextual advertisement selection system may scan the text of a web page for keywords, and select advertisements based on any keywords located in the text. When the web page is displayed for the user, contextual advertisement selection system provides the selected advertisements for display on the web page.

Dynamic web pages which are generated with client-side scripting languages (e.g., JavaScript or similar scripting languages), have contents which may change without generating new "page views" (e.g., changing a portion of the contents of the web page without a complete reloading of the web page). The contents of a dynamic web page may change due to a user interacting with features of the web page, for example, but the web page as a whole is not reloaded. As a result, the real-time state of the dynamic web page (which the user sees at any particular moment) may change substantially from the original, initially-loaded web page content. Current advertisement relevance matching techniques are based on page view events, where advertisements are matched to the contents of a web page at the time the web page is loaded. As a result, as the user interacts with the dynamic web page, and the content is modified, the advertisements in the web page may become less relevant to what the user is currently seeing and experiencing.

BRIEF SUMMARY OF THE INVENTION

Advertisements displayed in a web page are enabled to be changed as a context of the web page changes. For instance, a first set of one or more advertisements may be displayed on a web page. One or more of the displayed advertisements may be replaced with one or more alternative advertisements. Selection of the alternative advertisements is triggered based on the occurrence of one or more events that cause a change in a context of the web page. The display of the alternative advertisements is performed dynamically, without the web page needing to be completely reloaded. In this manner, the advertisements displayed on a web page may be changed based on the change in web page context, to provide advertisements to the user that better correspond to the changing context.

In one implementation, a method for dynamically providing advertisements in a web page is provided. A first request is transmitted for one or more advertisements for display on a web page. The first set of one or more advertisements is received, and is provided to be displayed on the web page. At least one event notification is received that indicates a modification to a context of the web page. A second request for one or more advertisements for display on the web page is generated based on the event notification(s). A second set of one or more advertisements is received, and is provided to be displayed on the web page in place of at least one advertisement of the first set.

In a further implementation of the method, a plurality of event notifications may be received that indicate a plurality of modifications to the context of the web page. The plurality of modifications to the context of the web page may be aggregated. The second request for advertisements may be generated when an event notification corresponding to a trigger event is received, such as when the aggregated context modification reaches a predetermined threshold.

In a further implementation of the method, a request from the web page for data from a web service may be received. The information related to the received request for data from the web service may be stored as a first event notification. The request for data may be transmitted to the web service. Response data may be received from the web service. The response data may be stored as a second event notification.

In another implementation, a dynamic advertisement provider configured to dynamically provide advertisements in a web page is provided. In one example implementation, the dynamic advertisement provider includes an advertisement request module (ARM) and a page event listener module (PELM). The ARM is configured to generate a first request for one or more advertisements for display on a web page, to receive a first set of one or more advertisements based on the first request, and to provide the first set of one or more advertisements to be displayed on the web page. The PELM is configured to receive at least one event notification indicating a modification to a context of the web page, and to provide the received at least one event notification to the ARM. The ARM is configured to generate a second request for one or more advertisements for display on the web page based on the event notification(s), to receive a second set of one or more advertisements based on the second request, and to provide the second set of one or more advertisements to be displayed on the web page in place of at least one advertisement of the first set.

In a further implementation, the PELM may include a context modification aggregator configured to receive a plurality of event notifications indicating a plurality of modifications to the context of the web page, and to aggregate the plurality of modifications to the context of the web page indicated by the plurality of event notifications to generate an aggregated modification to the context of the web page.

In a still further implementation, the ARM may include a context comparator configured to determine whether the aggregated modification has reached a predetermined threshold, and if the aggregated modification is determined to have reached the predetermined threshold, to enable the ARM to generate the second request.

In a still further implementation, the PELM may include a trigger event generator configured to determine whether a received event notification corresponds to a trigger event. The ARM may be configured to generate the second request if the received event notification is determined to correspond to the trigger event.

In a still further implementation, a web service interface may be configured to receive a request from the web page for data from a web service. The context modification aggregator may be configured to store information related to the received request for data from the web service as a first event notification. The web service interface may be configured to transmit the request for data to the web service, and to receive response data from the web service. The context modification aggregator may be configured to store the response data as a second event notification.

Computer program products are also described herein. The computer program products include a computer-readable medium having computer program logic recorded thereon for enabling advertisements to be dynamically displayed in a web page, according to the implementations described herein.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

Figure 1:
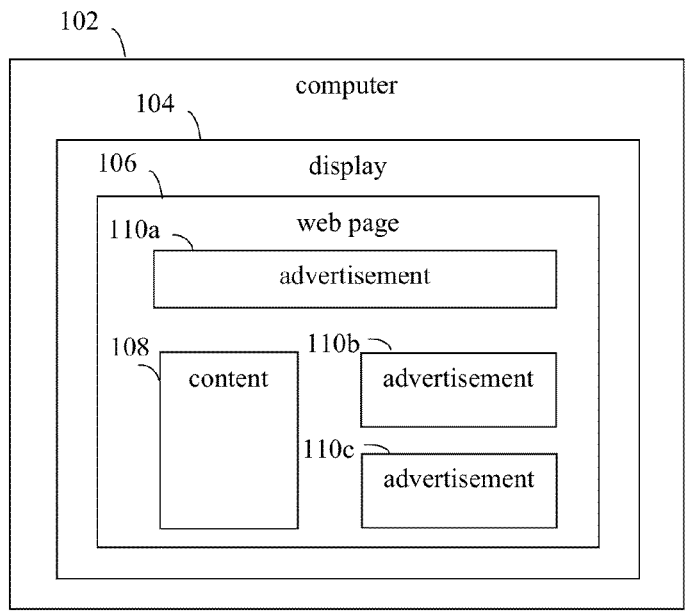
FIG. 1 shows a block diagram of a computer that a user may use to view content.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

Introduction

The present specification discloses one or more embodiments that incorporate the features of the invention. The disclosed embodiment(s) merely exemplify the invention. The scope of the invention is not limited to the disclosed embodiment(s). The invention is defined by the claims appended hereto.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

Figure 2:
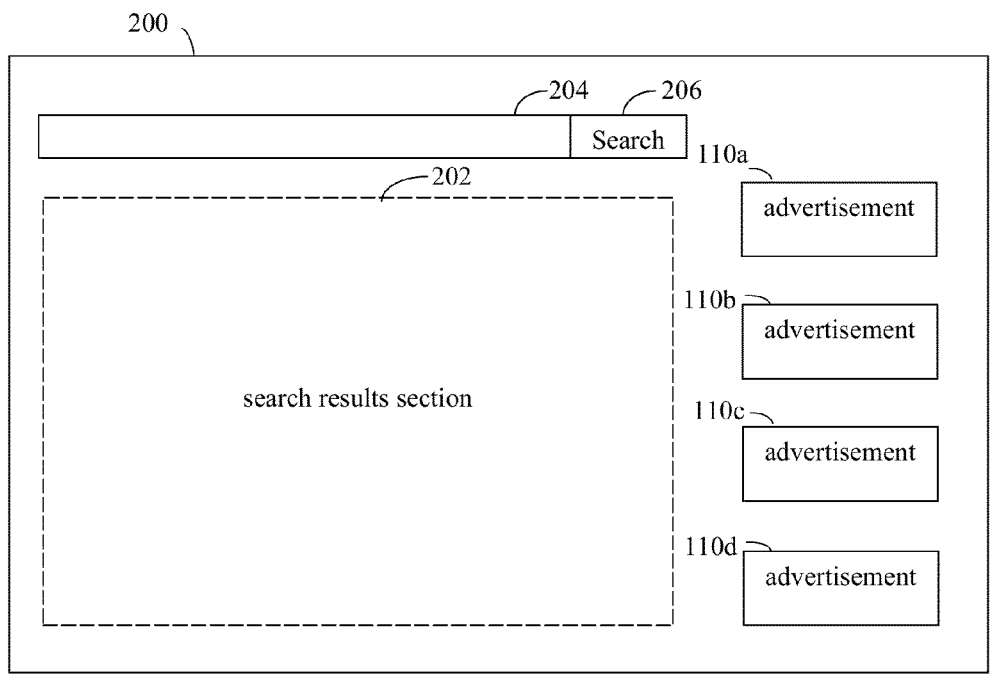
FIG. 2 shows an example search results page that may result from a user submitting a query to a search engine.

Embodiments of the present invention relate to online advertising, such as advertising in the form of contextual advertising and sponsored search. FIGS. 1 and 2 show examples of the displaying of advertisements in contextual advertising and sponsored search environments. For instance, FIG. 1 shows a block diagram of a computer 102 that a user may use to view content 108. As shown in FIG. 1, computer 102 has a display 104 that displays a web page 106. For example, web page 106 may be open in a web browser. The user may cause web page 106 to be displayed in any manner, including navigating to web page 106 according to a URL (uniform resource locator) address for web page 106. As shown in FIG. 1, web page 106 includes content 108 that the user has caused to be displayed by navigating to web page 106. Furthermore, web page 106 may include any number and arrangement of advertisements, including advertisements 110a-110c shown in FIG. 1. Advertisements 110a-110c may be displayed according to any suitable form, including as banner ads, floating ads, pop-up ads, and video ads. In the example of FIG. 1, advertisement 110a is shown as a banner ad at the top of web page 106 (e.g., a North banner), and advertisements 110b and 110c are both positioned adjacent to a right edge of web page 106. Advertisements 110a-110c may be selected for display by searching on text included in content 108, and selecting advertisements that are related to keywords found in the searched text.

FIG. 2 shows an example search results page 200 that may result from a user submitting a query to a search engine. Search results page 200 may be displayed by computer 102 of FIG. 1 in a similar manner as web page 106. Search results page 200 is typically a web page, and may be presented to the user by the search engine. As shown in FIG. 2, search results page 200 includes a search results section 802, a data entry box 204, and a search button 206. Data entry box 204 defines a user-editable area into which one or more query terms may be entered. Search button 206 comprises an interface element that, when activated by a user, causes the search engine to execute a document search based on the query term(s) entered in data entry box 204. Search results section 202 is used to display information about documents identified by the search engine in response to the submitted search query.

Search results page 200 may include any number and arrangement of advertisements, including advertisements 110a-110d shown in FIG. 2. Advertisements 110a-110d may be displayed in search results page 200 according to any suitable form, including as banner ads, floating ads, pop-up ads, text ads, and video ads. In the example of FIG. 2, advertisements 110a-110d are displayed in a column adjacent to a right edge of web page 106. Advertisements 110a-110d may each be sponsored search ads provided by advertisers. An advertiser may pay or provide other compensation for having one or more of advertisements 110a-110d appear in a sponsored section of search results page 200 for one or more particular queries.

Web page 106 shown in FIG. 1 and search results page 200 may be dynamic web pages. Dynamic web pages have contents which may change without generating new "page views" (e.g., a portion of the contents of the web page may change without a reloading the web page). Dynamic web pages may be generated in various ways, including being generated with client-side scripting languages (e.g., JavaScript or similar scripting languages). The contents of a dynamic web page may change due to a user interacting with features of the web page, for example. For instance, referring to FIG. 1, a user viewing web page 106 may move their cursor over, or click on, a feature displayed in content 108. By moving their cursor over or clicking on the feature displayed in content 108, content 108 may be modified, such as by displaying or modifying an image associated with the feature, displaying or modifying text related to the feature, and/or other content modification. Referring to FIG. 2, a user viewing search results page 200 may enter a new query into data entry box 204, which may cause a change in the content of search results section 202 or other change in content, including a display of search query assist terms, and/or other content modification.

In either case (FIG. 1 and FIG. 2), the modified content may be displayed without reloading web page 106 or search results page 200. As a result, the real-time state of the dynamic web page (which the user sees at any particular moment) may change substantially from the original, initially-loaded web page content, and the modified version is not always addressable (e.g., using URL address). Conventional advertisement relevance matching techniques are based on page view events, where advertisements are matched to the contents of a web page at the time the web page is loaded. As a result, as the user interacts with the dynamic web page, and the content changes, the advertisements in the web page may become less relevant to what the user is currently seeing and experiencing. Referring to FIG. 1, as content 108 is modified without reloading web page 106, advertisements 110a-110c may become less relevant to the context of web page 106 than when they were originally loaded. Referring to FIG. 2, as the content of search results page 200 is modified without reloading search results page 200, advertisements 110a-110d may become less relevant to the context of search results page 200 than when they were originally loaded.

Embodiments of the present invention overcome deficiencies of conventional advertisement relevance matching techniques, enabling greater numbers of advertisements and advertisements having greater relevance to be displayed in dynamic web pages, without web page reloading. Example embodiments for dynamically providing advertisements are described in the following section.

Example Embodiments for Dynamically Providing Advertisements

Example embodiments are described herein for dynamically providing advertisements in web pages. The example embodiments described herein are provided for illustrative purposes, and are not limiting. Further structural and operational embodiments, including modifications/alterations, will become apparent to persons skilled in the relevant art(s) from the teachings herein.

As described above, dynamic web pages (e.g., which may be generated with client-side JavaScript or similar client-side scripting languages), have contents which change without generating new "page views." A lack of discrete page view events means that the real-time state of the web page (that which the user sees at any moment) may change substantially from the web page content which is initially loaded, and thus advertisements displayed to the user may become less relevant to what the user is currently seeing and experiencing.

Embodiments are provided for matching and delivering advertisements to dynamic web pages. User interactions with a dynamic web page (e.g., by clicking on links, inputting text strings, panning and zooming in a map, etc.) generate events (which may include application programming interface (API) calls), which are collected and used to identify the real-time content of the web page, and a context of the user's interactions. This information is used to update the in-page advertisements displayed to the user, providing more situationally relevant advertisements, which change as the context of the web page changes.

Figure 3:
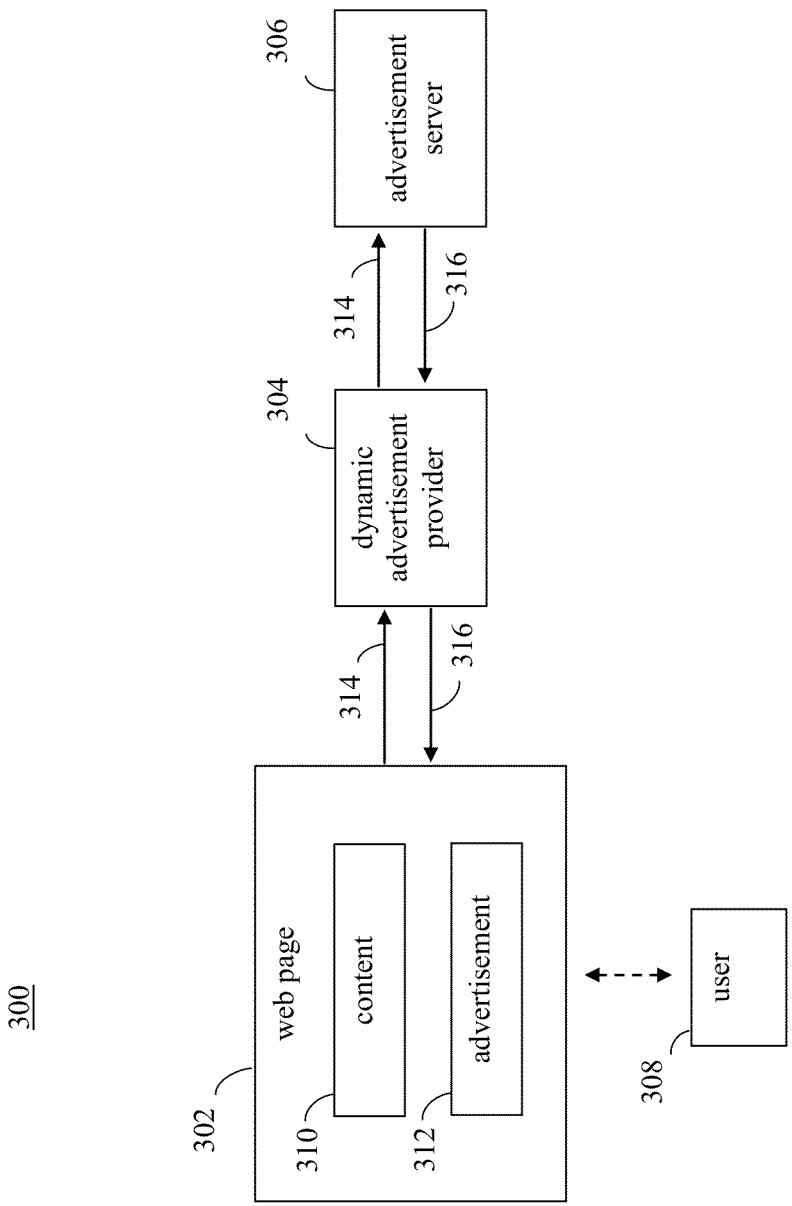
FIGS. 3 and 5 show block diagram views of a dynamic advertisement system, according to example embodiments of the present invention.

Various embodiments for dynamically providing advertisements on web pages are described herein. For instance, FIG. 3 shows a block diagram of a dynamic advertisement system 300, according to an example embodiment of the present invention. As shown in FIG. 3, system 300 includes a web page 302, a dynamic advertisement provider 304, and an advertisement server 306. Dynamic advertisement provider 304 is configured to provide advertisements for display on a web page 302 in a dynamic manner, such that advertisements displayed in web page 302 may be repeatedly updated without having to reload web page 302. Dynamic advertisement provider 304 may be implemented in hardware, software, firmware, or any combination thereof. For example, dynamic advertisement provider 304 may be implemented as computer code configured to be executed in one or more processors. Alternatively, dynamic advertisement provider 304 may be implemented as hardware logic/electrical circuitry.

Figure 4:
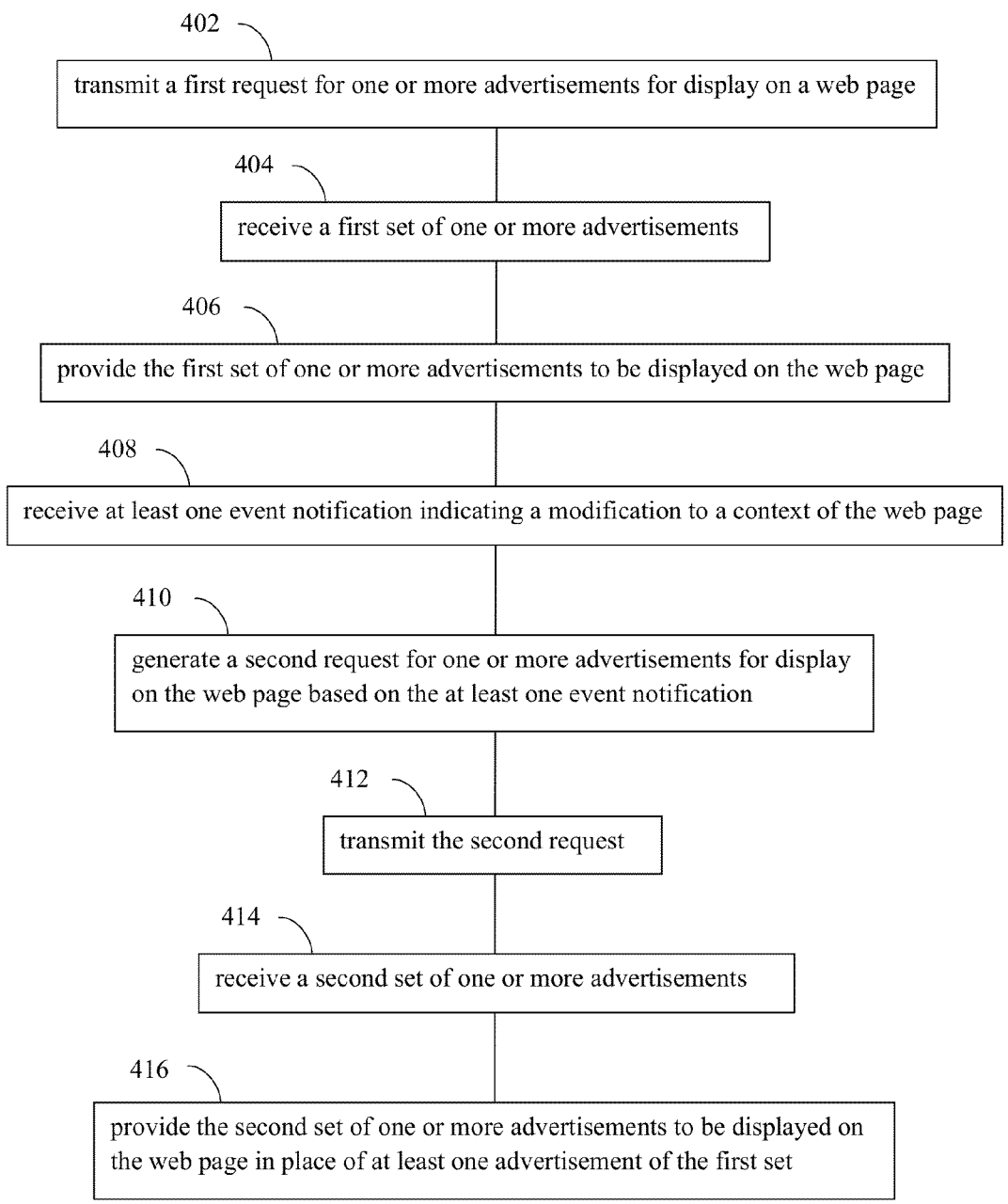
FIG. 4 shows a flowchart for dynamically providing advertisements, according to an example embodiment of the present invention.

System 300 is described as follows with respect to FIG. 4. FIG. 4 shows a flowchart 400 for dynamically providing advertisements, according to an example embodiment of the present invention. Dynamic advertisement provider 304 may operate according to flowchart 400, for example. Further structural and operational embodiments will be apparent to persons skilled in the relevant art(s) based on the discussion regarding flowchart 400. Flowchart 400 is described as follows.

Flowchart 400 begins with step 402. In step 402, a first request for one or more advertisements for display on a web page is transmitted. As shown in FIG. 3, web page 302 is displayed. Web page 302 may display content, such as content 310. Content 310 may be included in the source code for web page 302, and/or may be requested from one or more content servers. Content 310 may be similar to content 108 shown in FIG. 1 and/or the content of search results page 200 shown in FIG. 2, for example. Typically, advertisements to be displayed in web page 302, such as advertisement 312, are requested from an advertisement server, such as advertisement server 306. At the time web page 302 is loaded, dynamic advertisement provider 304 receives a first request 314 from web page 302 for one or more advertisements to display. First request 314 may include information regarding a context of web page 302 that may be used to select advertisements for web page 302. As shown in FIG. 3, dynamic advertisement provider 304 transmits first request 314 to advertisement server 306.

In step 404, a first set of one or more advertisements is received. In response to first request 314, advertisement server 306 selects one or more advertisements. Advertisements server 306 may select the one or more advertisements based on a context of web page 302, which may be included in information received in first request 314. The context of web page 302 may be based upon a variety of factors, including being based upon content 310 of web page 302, attributes of a user 308 causing web page 302 to be displayed, attributes of an electronic device being used to display web page 302, and/or other elements of context. As shown in FIG. 3, advertisement server 306 transmits a first set of advertisements 316, which is received by dynamic advertisement provider 304. First set of advertisements 316 may include any number of one or more advertisements selected by advertisement server 306, depending on the number of advertisements to be displayed in web page 302.

In step 406, the first set of one or more advertisements to be displayed on the web page is provided. As shown in FIG. 3, dynamic advertisement provider 304 provides first set of advertisements 316 to web page 302 for display. In the example of FIG. 3, first set of advertisements 316 includes advertisement 312, which is shown displayed in web page 302.

Figure 5:
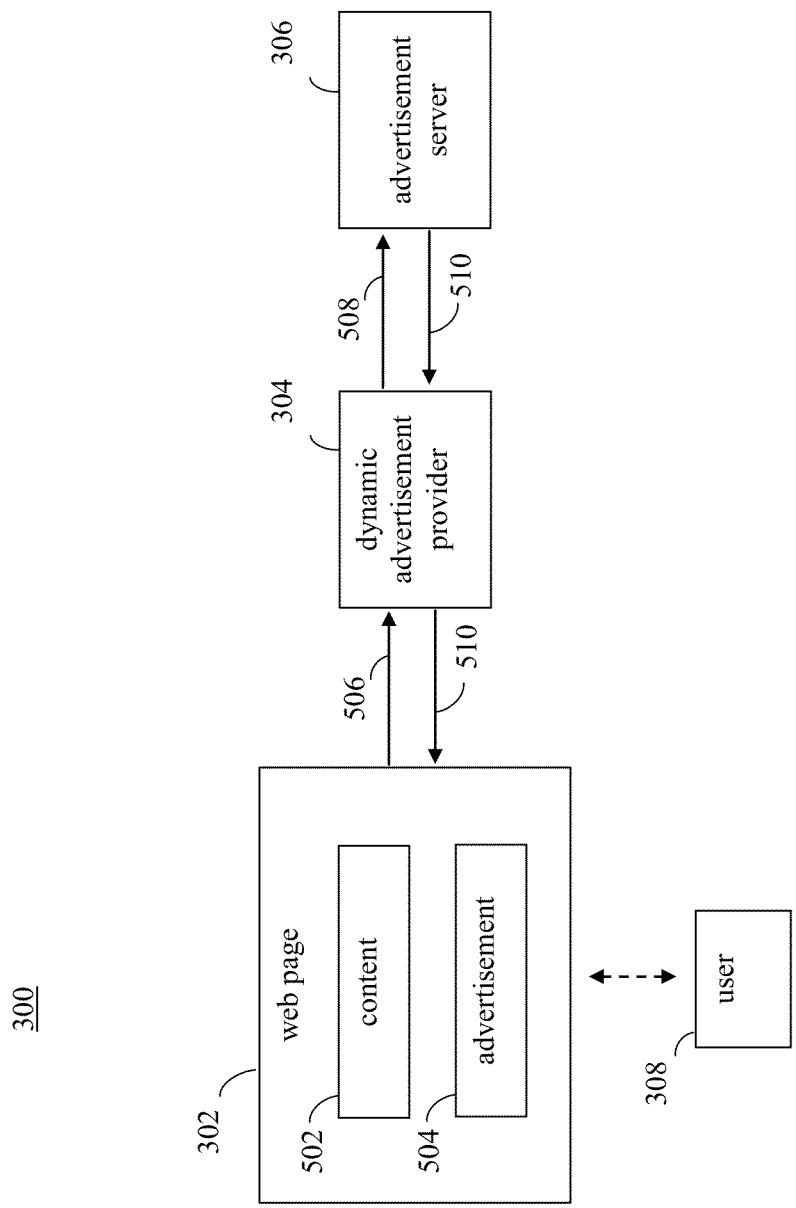

In step 408, at least one event notification indicating a modification to a context of the web page is received. FIG. 5 shows another view of system 300, where an event notification 506 is received by dynamic advertisement provider 304 from web page 302, according to an example embodiment of the present invention. Event notification 506 indicates that a modification to the context of web page 302 has occurred. Dynamic advertisement provider 304 may receive any number of one or more event notifications 506 from web page 302 over time.

The modification to the context of web page 302 indicated by event notification 506 may occur in various ways, including by user 308 interacting with content 310 of web page 302, by code/scripts (e.g., JavaScript or other scripting language) of web page 302 causing modification to content 310, and/or in other ways. Examples of modifications to the context of web page 302 include user 308 causing a pop-up window/text/graphics to appear and/or be modified in web page 302 by moving a mouse pointer over a feature of content 310, clicking on a feature of content 310, or other action by user 308, user 308 typing text into an entry box in web page 302, such as a search query or other textual information, user 308 panning across a map displayed as content 310 in web page 302 (e.g., panning from a first location to a second location in the map), user 308 selecting an option from a checklist, a drop-down menu, or other selectable feature of content 310, and/or any other way that user 308 may interact with content 310 of web page 302. For example, FIG. 5 shows a content 502 in web page 302, which is a modified form of content 310 (previously shown displayed in web page 302 in FIG. 3). The modification to the context of web page 302 may be based directly upon the interaction of user 308 with content 310 (e.g., text entered by user 308) or indirectly due to the interaction of user 308 with content 310 (e.g., information generated script due to an interaction by user 308 with content 310).

Information regarding the modification to the context of web page 302 may be included in event notification 506. For example, event notification 506 may include text entered by user 308 (e.g., a search query), new text appearing in web page 302 (e.g., generated by JavaScript or other scripting language), tags associated with new or modified graphics and/or text appearing in web page 302, an indication of options selected by user 308, a new map location viewed by user 308 in web page 302, and/or any other information regarding the modification to the context of web page 302.

In step 410, a second request for one or more advertisements for display on the web page is generated based on the at least one event notification. In an embodiment, dynamic advertisement provider 304 may generate a second request for advertisements that includes information regarding the one or more event notifications 506 received from web page 302. The second request for advertisements may be generated because the relevance of set of advertisements 316 previously provided for display in web page 302 may have decreased due to the change(s) in context in web page 302 indicated by event notification(s) 506. Dynamic advertisement provider 304 may generate a second request upon the occurrence of one or more triggering events, such as receiving a predetermined number of event notifications 506, receiving a particular type of event notification 506, passage of a predetermined amount of time, another type of triggering event, and/or any combination of triggering events.

In step 412, the second request is transmitted. As shown in FIG. 5, dynamic advertisement provider 304 may transmit a second request 508, which is the second request for advertisements generated based on one or more event notifications 506. Second request 508 is received by advertisement server 306. Based on the information regarding event notification(s) 506 included in second request 508, advertisement server 306 may select one or more additional and/or alternative advertisements for display in web page 302. For example, advertisement server 306 may select the one or more additional and/or alternative advertisements based on conventional context matching techniques such as may have been performed by advertisement server 306 as described above with regard to step 404.

In step 414, a second set of one or more advertisements is received. As shown in FIG. 5, advertisement server 306 transmits a second set of advertisements 510, which is received by dynamic advertisement provider 304. Second set of advertisements 510 may include any number of one or more advertisements, depending on the number of advertisements determined to be displayed in place of advertisements currently displayed in web page 302 (e.g., first set of advertisements 316).

In step 416, the second set of one or more advertisements is provided to be displayed on the web page in place of at least one advertisement of the first set. As shown in FIG. 5, dynamic advertisement provider 304 provides second set of advertisements 510 to web page 302 for display. In the example of FIG. 5, second set of advertisements 510 includes an advertisement 504, which is shown displayed in web page 302 in place of advertisement 312. Note that advertisement 504 is displayed in web page 302 even though web page 302 is not reloaded.

According to system 300 and flowchart 400, one or more advertisements may be provided to replace one or more other advertisements displayed in a web page as the context of the web page changes, prior to any reloading of the web page, rather than the same one or more advertisements being displayed in the web page from the time the web page is first loaded, as in conventional advertisement providing systems. This provides advantages to advertisement providers, because greater numbers of advertisements may be displayed during any single loading of a web page. This also provides advantages to consumers, because advertisements displayed on a web page to a consumer may be updated as further information regarding the consumer is gained due to modifications in the context of the web page. In this manner, the consumer may be enabled to view advertisements of increasing relevance while viewing and/or interacting with the web page.

System 300 may be implemented in various ways. For example, in an embodiment, web page 302 and dynamic advertisement provider 304 may be hosted on different computer systems, and may communicate with each other through a network. In another embodiment, web page 302 and dynamic advertisement provider 304 may be present on the same computer system, and thus may communicate with each other in an inter-computer manner.

Figure 6:
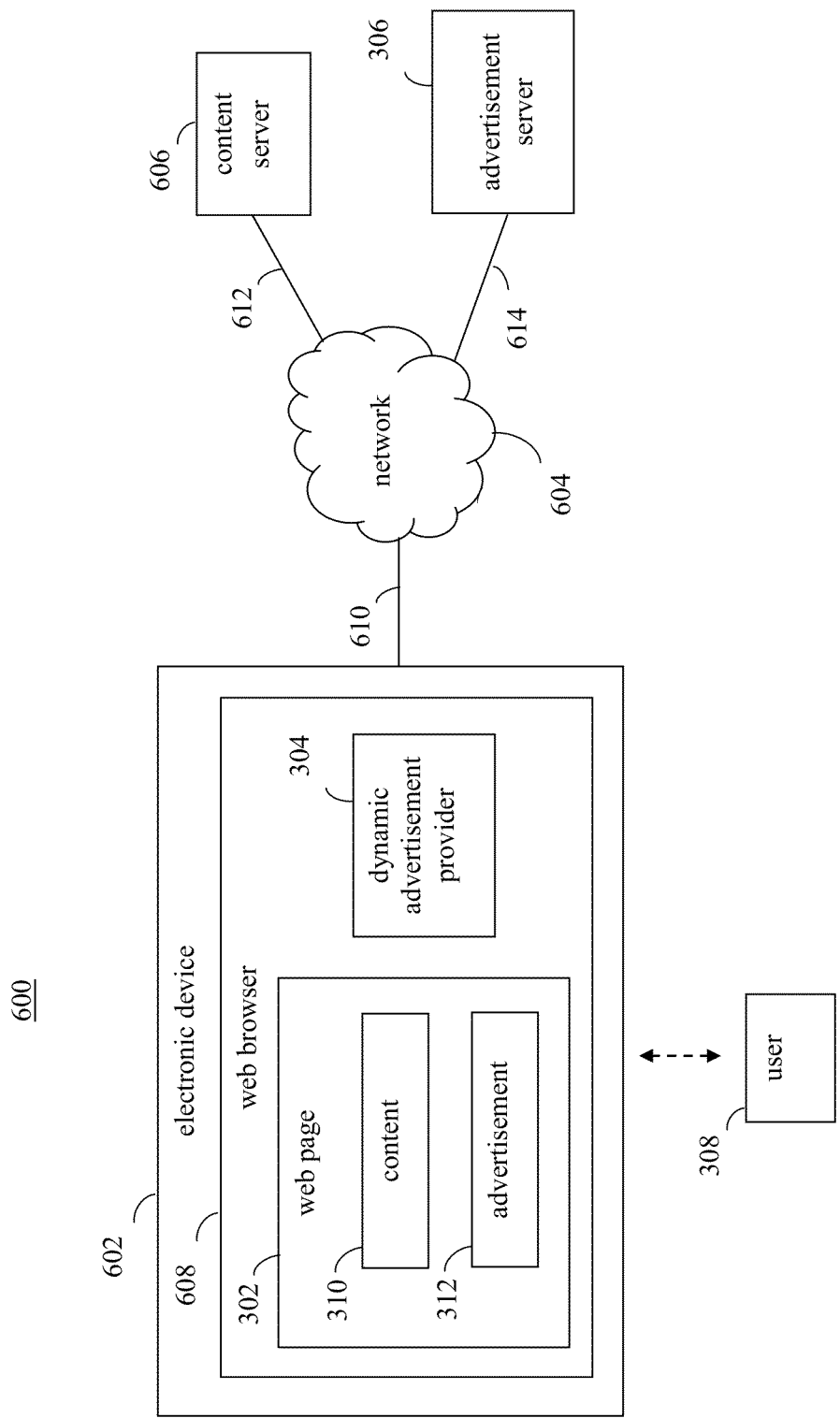
FIG. 6 shows a dynamic advertisement providing system, according to an example embodiment of the present invention.

For instance, FIG. 6 shows a dynamic advertisement system 600, according to an example embodiment of the present invention. System 600 is an example of system 300 shown in FIG. 3. As shown in FIG. 6, system 600 includes an electronic device 602, a network 604, a content server 606, and advertisement server 306. As shown in FIG. 6, electronic device 602 includes webpage 302 and dynamic advertisement provider 304. The elements of system 600 are described as follows.

Electronic device 602 may be any type of electronic device that may be configured with web browsing functionality, including a desktop computer (e.g., a personal computer, etc.), a mobile computing device (e.g., a cell phone, smart phone, a personal digital assistant (PDA), a laptop computer, a notebook computer, etc.), or a mobile email device (e.g., a RIM Blackberry® device).

As shown in FIG. 6, electronic device 602 is coupled to network 604 by a communication link 610. Network 604 may be any type of communication network, such as a local area network (LAN), a wide area network (WAN), a personal area network (PAN), or a combination of communication networks. In embodiments, network 604 may include the Internet and/or an intranet. Electronic device 602 can communicate with entities over network 604, including content server 606 and advertisement server 306. As shown in FIG. 6, content server 606 is coupled to network 604 by a communication link 612, and advertisement server 306 is coupled to network 604 by a communication link 614. In embodiments where network 604 includes the Internet, web pages, such as web page 302, which form a portion of the World Wide Web, are available for retrieval by electronic device 602 through network 604. On the Internet, web pages may be identified/located by a uniform resource locator (URL), such as http://www.yahoo.com, and/or by other mechanisms. Electronic device 602 can access web page 302 through network 604 by supplying a URL corresponding to web page 302 to a document server (not shown in FIG. 3).

Figure 7:
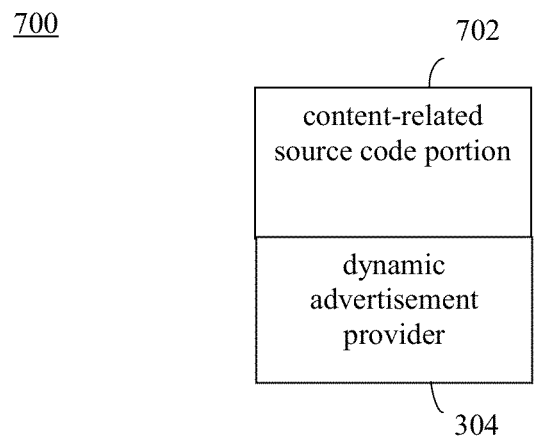
FIG. 7 shows a block diagram of a web page source code, according to an example embodiment of the present invention.

Electronic device 602 operates a web browser 608, which is configured to load and display web pages such as web page 302. Furthermore, web browser 608 may include dynamic advertisement provider 304, or may be configured to load dynamic advertisement provider 304. In an embodiment, web page 302 and dynamic advertisement provider 304 may be received separately and loaded separately into web browser 608. In another embodiment, web page 302 and dynamic advertisement provider 304 may be packaged together and loaded together in web browser 608. For instance, FIG. 7 shows a block diagram of a web page source code 700, according to an example embodiment of the present invention. As shown in FIG. 7, web page source code 700 includes a content related source code portion 702 and dynamic advertisement provider 304. In such an embodiment, dynamic advertisement provider 304 may have the form of program code. Web browser 608 may request a web page 302 from a server, and in response may receive web page source code 700 corresponding to webpage 302. Web browser 608 may obtain content 310 for web page 302 by accessing one or more content servers 606 through network 604 as indicated by content related source code portion 702. Furthermore, web browser 608 may obtain one or more advertisements 312 for web page 302 by accessing advertisement server 306 through network 604 according to dynamic advertisement provider 304, as described above.

Figure 8:
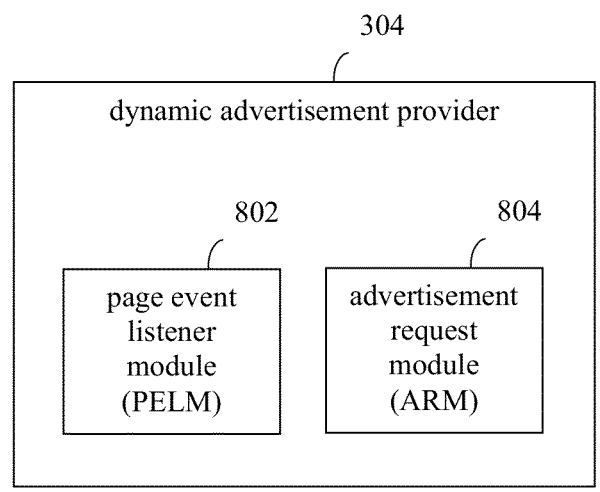
FIG. 8 shows a block diagram of a dynamic advertisement provider, according to an example embodiment of the present invention.

Dynamic advertisement provider 304 may be configured in various ways to perform its functions. For instance, FIG. 8 shows a block diagram of dynamic advertisement provider 304, according to an example embodiment of the present invention. As shown in FIG. 8, dynamic advertisement provider 304 may include a page event listener module (PELM) 802 and an advertisement request module (ARM) 804. In an embodiment, ARM 804 may be configured to perform steps 402-406 and 410-416 of flowchart 400, and PELM 802 may be configured to perform step 408.

PELM 802 and ARM 804 may be implemented in hardware, software, firmware, or any combination thereof. For example, PELM 802 and/or ARM 804 may be implemented as computer code configured to be executed in one or more processors. Alternatively, PELM 802 and/or ARM 804 may be implemented as hardware logic/electrical circuitry. For instance, in an embodiment, ARM 804 may include a JavaScript (or other programming or scripting language) library which includes functionality in the form of program code for inserting advertisements into a web page.

Referring to FIG. 3, ARM 804 may be configured to generate first request 314 to be transmitted to advertisement server 306 for one or more advertisements for display on web page 302, to receive first set of advertisements 316, and to provide first set of advertisements 316 to be displayed on web page 302. Referring to FIG. 5, PELM 802 may be configured to receive event notification(s) 506 indicating modifications to a context of web page 302, and to provide event notification(s) to ARM 804.

In an embodiment, PELM 802 name monitor modifications to web page 302 as modifications to a document object model (DOM) that is representative of web page 302. A static web page contains HTML which is served in a final structure and form by a web server. On the web server, the HTML document may be constructed dynamically, or may be read from a static file in storage, and served. Either of these types of HTML document may be considered to be static web pages. The structure and contents of a static web page does not change once the web page has been transmitted to the client browser (e.g., to web browser 608 shown in FIG. 6). In contrast, a dynamic web page includes content and/or structure that may be modified after the web page has been loaded by web browser 608.

When an HTML document is loaded by web browser 608, an in-memory data structure corresponding to the structure and contents of the HTML document is generated. This data structure is the DOM. The DOM represents the HTML document in web browser 608, and includes the content of the HTML document, the structural relationships among elements of the HTML document, as well as presentational descriptions and/or further elements. The DOM is a tree-structure that includes nodes arranged in a hierarchy. The nodes can be HTML elements, text nodes representing the text content of the HTML document, attributes of elements, images, etc. In an embodiment, when web browser 608 reads an HTML document, it generates the DOM tree structure to represent the HTML document.

A dynamic web page contains some script elements (typically written in a DOM scripting language such as JavaScript or ECMAScript). Such scripts are executed in either the in-order parsing of the HTML document or in response to events generated by the DOM. The scripts of a dynamic web page can modify the DOM tree structure, such as by adding nodes, removing nodes, moving nodes, changing values and properties, event synthesizing, and further types of events. The scripts can also load additional data from an external source by issuing subsequent HTTP requests to external servers. The retrieved data is parsed by the script, and can be inserted into the DOM tree or otherwise used to modify the DOM.

PELM 802 may be configured to receive DOM events which modify the contents of the page in the form of event notifications 506. For example, event notifications 506 may have the form of particular types of modifications, including a DOMNodeInserted event (e.g., a node inserted into the DOM tree), a DOMNodeRemoved event (e.g., a node removed from the DOM tree), a DOMSubtreeModified event (e.g., a modification to a node of the DOM tree), or other type of modification, each of which may be provided to PELM 802 when the DOM is correspondingly modified. PELM 802 may include event listeners for these and many form elements, hyperlinks, images, etc., which respond to onClick, on Change, or other events generated when the user interacts with the elements of the web page (e.g., types a value into a form field, clicks a button, selects something, etc).

Referring to FIG. 5, ARM 804 may be configured to generate second request 508 to be transmitted to advertisement server 306 for one or more advertisements for display on web page 302 based on event notification(s) 506, to receive second set of advertisements 510, and to provide second set of advertisements 510 to be displayed on web page 302 in place of one or more advertisements of first set of advertisements 316.

Figure 9:
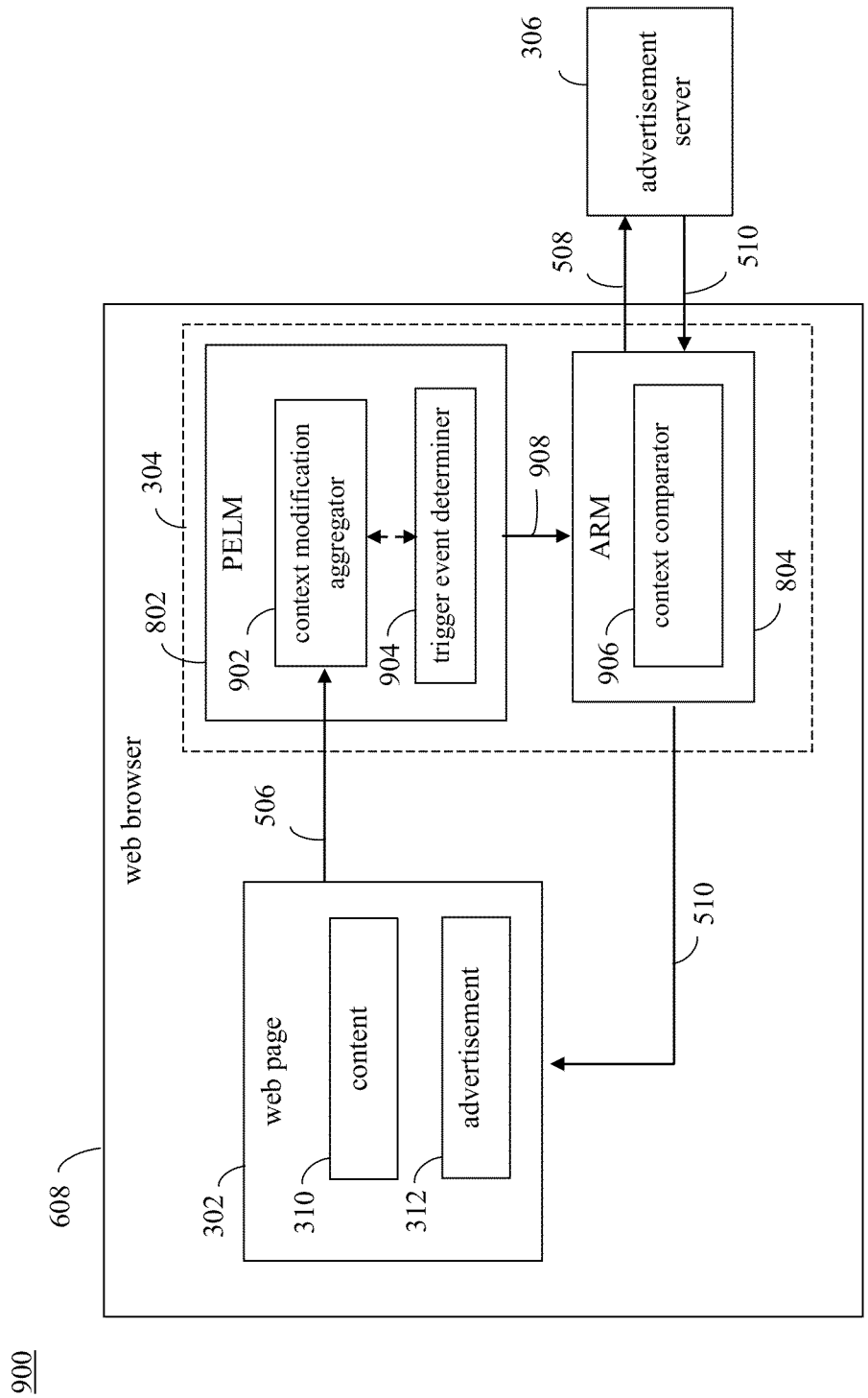
FIG. 9 shows a block diagram of a system for communications between a web browser and an advertisement server, according to an example embodiment of the present invention.

PELM 802 and ARM 804 may be configured in various ways to perform their respective functions. For example, FIG. 9 shows a block diagram of a system 900 for communications between web browser 608 and advertisement server 306, according to an example embodiment of the present invention. Web browser 608 includes (e.g., has loaded) web page 302 and examples of PELM 802 and ARM 804. System 900 is described as follows.

Figure 10:
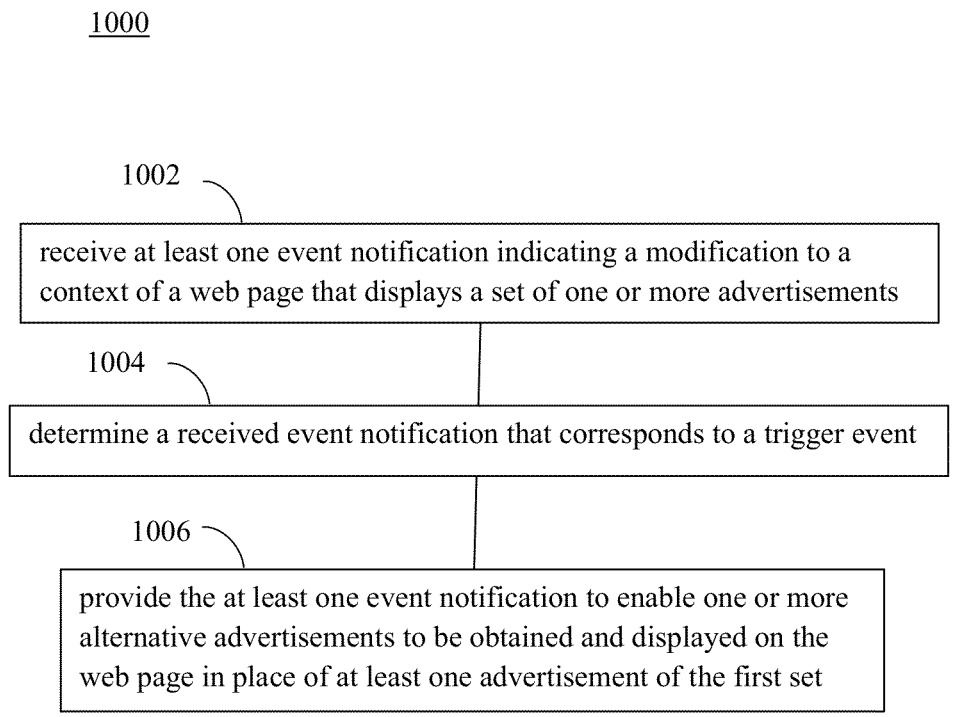
FIG. 10 shows a flowchart for enabling a web page to be dynamically updated with advertisements, according to an example embodiment of the present invention.

As shown in FIG. 9, in an embodiment, PELM 802 may include a context modification aggregator 902 and a trigger event determiner 904. Context modification aggregator 902 and trigger event determiner 904 are described as follows with respect to FIG. 10. FIG. 10 shows a flowchart 1000 for enabling a web page to be dynamically updated with advertisements, according to an example embodiment of the present invention. Further structural and operational embodiments will be apparent to persons skilled in the relevant art(s) based on the discussion regarding flowchart 1000. Flowchart 1000 is described as follows.

Flowchart 1000 begins with step 1002. In step 1002, at least one event notification indicating a modification to a context of a web page that displays a set of one or more advertisements is received. For example, as shown in FIG. 9, context modification aggregator 902 receives event notification 506. As described above, event notification 506 indicates a modification to a context of web page 302. As shown in FIG. 9, web page 302 displays content 310 and advertisement 312 (which may have been previously loaded into web page 302 by ARM 804 according to steps 402-406 shown in FIG. 4, for instance). Context modification aggregator 902 may be configured to store event notification 506 in storage (e.g., in one or more memory devices (e.g., cache memory), storage devices, or other storage) associated with electronic device 602 shown in FIG. 6. In an embodiment, context modification aggregator 902 may be configured to perform the step of aggregating a plurality of event notifications 506 received from web page 302 to generate an aggregated modification to the context of web page 302.

In step 1004, an event notification that corresponds to a trigger event is determined. For example, trigger event determiner 904 may monitor event notifications 506 received by context modification aggregator 902 for the receipt of an event notification 506 corresponding to a trigger event. Trigger event determiner 904 may be configured to monitor event notifications 506 for various types of and/or combinations triggering events. Examples of triggering events include the receipt of a predetermined number of event notifications 506 (e.g., a pre-determined amount of content is added to the DOM, a predetermined amount of content is removed from the DOM, a predetermined amount of content is modified in the DOM, any combination thereof, etc.), the receipt of a particular type of event notification 506 (e.g., any type of event described elsewhere herein, including a user interacting with an element on web page 302, typing a search query into a dialog box, panning across a map to a new location, selecting and option in a checklist or drop-down box, etc.), the passage of a predetermined amount of time, or other suitable type of triggering event. When trigger event determiner 904 determines that an event notification 506 corresponding to a trigger event is received, step 1006 may be performed.

In step 1006, the at least one event notification is provided to enable one or more alternative advertisements to be obtained and displayed on the web page in place of at least one advertisement of the first set. For example, trigger event determiner 904 may instruct context modification aggregator 902 to transmit an aggregated context modification 908 to ARM 804 after determining a trigger event has occurred (e.g., in step 1004).

As shown in FIG. 9, ARM 804 receives aggregated context modification 908. As described above, ARM 804 may perform steps 410-416 of flowchart 400 shown in FIG. 4. Referring to FIG. 9, ARM 804 may be configured to generate second request 508 to be transmitted to advertisement server 306 for one or more advertisements for display on web page 302 based on aggregated context modification 908. As shown in FIG. 9, ARM 804 may include a context comparator 906. Context comparator 906 may be configured to determine whether the aggregated context modification to web page 302 indicated by aggregated context modification 908 has reached a predetermined threshold. If aggregated context modification 908 is determined to have reached the predetermined threshold, ARM 804 may generate second request 508. If aggregated context modification 908 is not determined to have reached the predetermined threshold, ARM 804 may accumulate aggregated content modification 908 received from context modification aggregator 902 until the accumulated aggregated content modification reaches a predetermined threshold.

As described above and shown in FIG. 9, ARM 804 transmits second request 508, which is received by advertisement server 306. In response, advertisement server 306 selects a second set of advertisements based on the modified context indicated in second request 508, and transmits second set of advertisements 510. ARM 804 may receive second set of advertisements 510 from advertisement server 306, and may provide second set of advertisements 510 (e.g., including advertisement 504 shown in FIG. 5) to be displayed on web page 302 in place of one or more advertisements of first set of advertisements 316, including advertisement 312.

Note that context modification aggregator 902, trigger event determiner 904, and context comparator 906 may be implemented in hardware, software, firmware, or any combination thereof. For example, context modification aggregator 902, trigger event determiner 904, and/or context comparator 906 may be implemented as computer code configured to be executed in one or more processors. Alternatively, context modification aggregator 902, trigger event determiner 904, and/or context comparator 906 may be implemented as hardware logic/electrical circuitry.

In embodiments, information regarding modifications to the context of web page 302 may be obtained with regard to network-based applications (e.g., web services) that are accessed by web page 302. Data and web service APIs (application programming interfaces) (such as Yahoo!® Maps, Yahoo!® Local, etc.) currently do not generate revenue for the service provider (e.g., Yahoo!®) or the consumer (web developers, mashup builders, etc). Developers often want to generate revenue through placing advertisements on their web pages through services like Google® AdSense or Yahoo!® Content Match. However, as mentioned above, the nature of conventional data-driven, dynamic websites is that the relevance of displayed advertisements diminishes as users interact with the pages. Alternative models of embedding ads in the data streams, such as Yahoo!® Content Match for RSS, do not have clear analogs when data is being distributed via XML, JSON, or other protocols. Furthermore, when those data streams are being consumed by software components, not humans in an RSS reader, it is difficult to guarantee that the advertisements are delivered to the user.

Embodiments of the present invention enable the monitoring of API calls. When data is requested from a remote application in the form of an API call, the data may be requested in response to some an event in the web page, which may alter the context of the web page. As a result, a second set of advertisements may be desired to be displayed in the web page that better reflects the altered context of the web page. In this manner, more targeted advertisements can be displayed on a web page in real-time, reflecting the current contents being served by the web services. An API call from a web page may be received as an event notification by context modification aggregator 902, and may be optionally considered to be a type of trigger event by trigger event determiner 904, if desired for the particular implementation.

Figure 11:
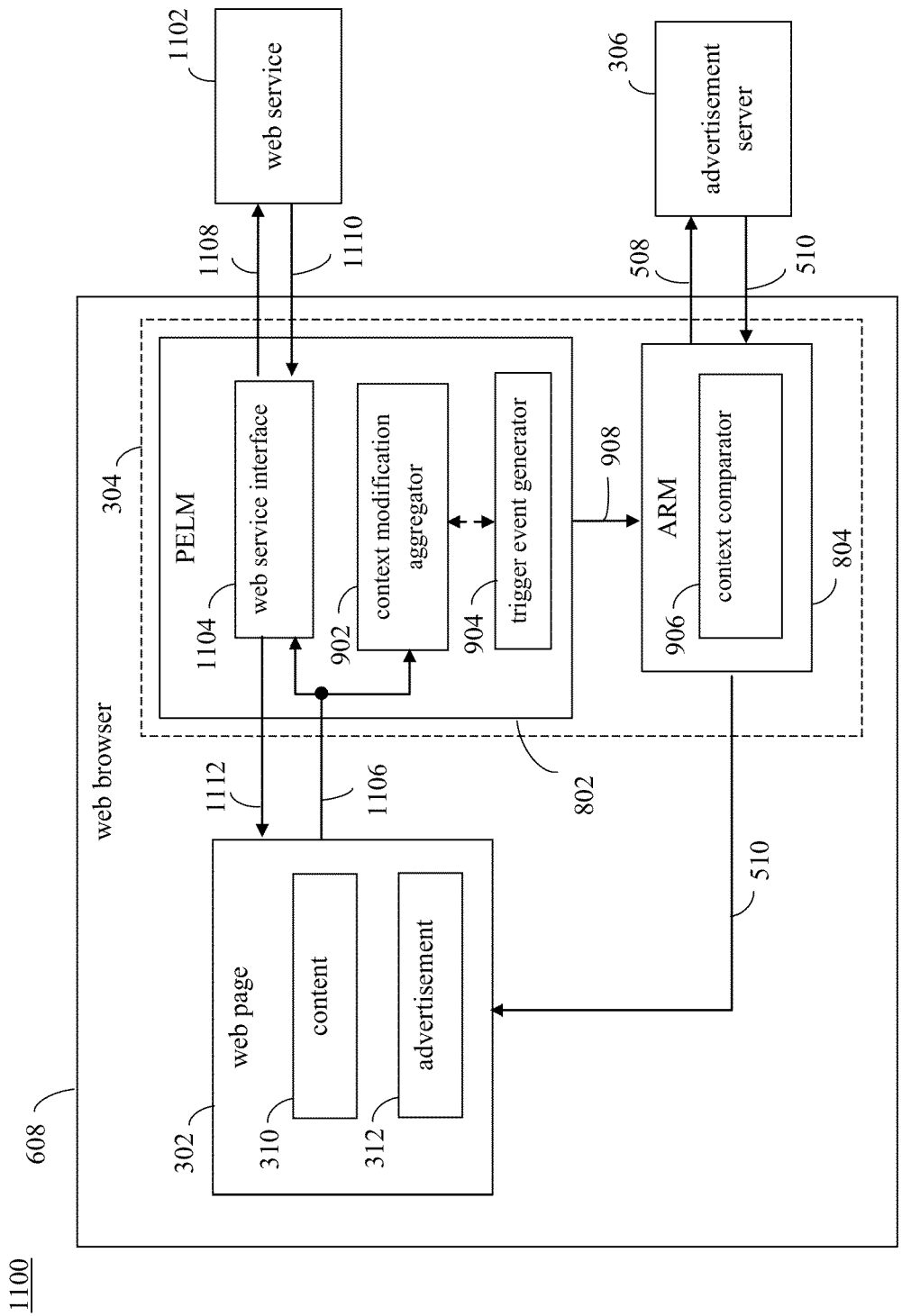
FIG. 11 shows a block diagram of a system for communications between a web browser, a web service, and an advertisement server, according to an example embodiment of the present invention.

For example, FIG. 11 shows a block diagram of a system 1100 for communications between web browser 608, advertisement server 306, and a web service 1102, according to an example embodiment of the present invention. In FIG. 11, web browser 608 includes (e.g., has loaded) web page 302 and examples of PELM 802 and ARM 804. System 1100 is described as follows.

Figure 12:
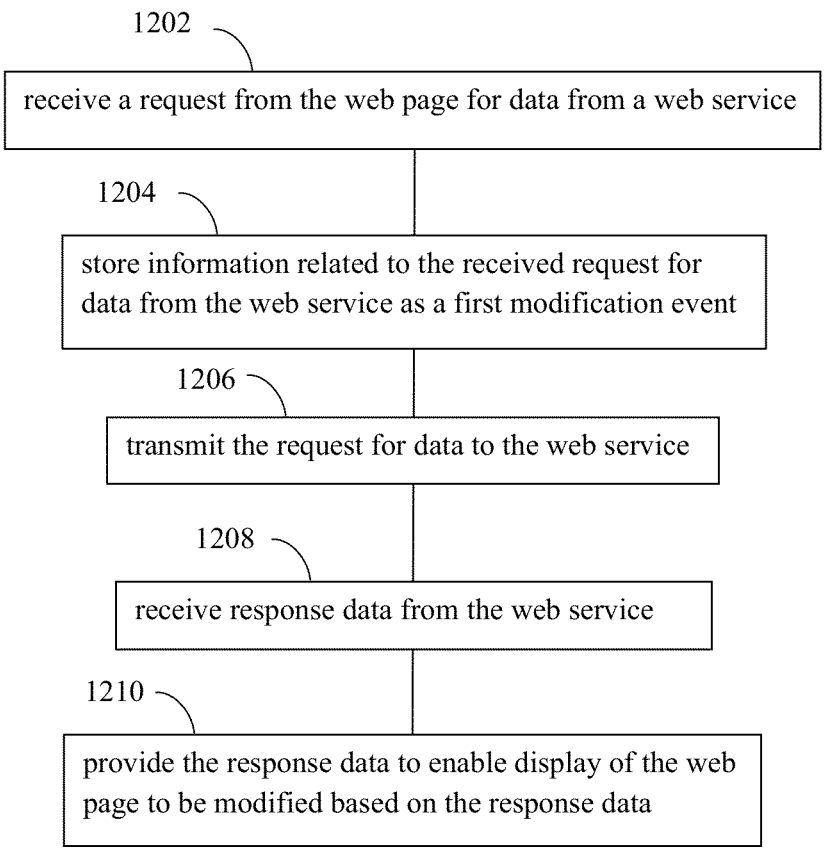
FIG. 12 shows a flowchart for accessing a web service, according to an example embodiment of the present invention.

As shown in FIG. 11, in an embodiment, PELM 802 may include context modification aggregator 902, trigger event determiner 904, and a web service interface 1104 (note that in an alternative embodiment, web service interface 1104 may be separate from PELM 802). Web service interface 1104 is described as follows with respect to FIG. 12. FIG. 12 shows a flowchart 1200 for enabling communications between a web page and a web service, according to an example embodiment of the present invention. Further structural and operational embodiments will be apparent to persons skilled in the relevant art(s) based on the discussion regarding flowchart 1200. Flowchart 1200 is described as follows.

Flowchart 1200 begins with step 1202. In step 1202, a request from the web page is received for data from a web service. For example, as shown in FIG. 11, web service interface 1104 and context modification aggregator 902 receive a web service data request 1106 from web page 302.

In step 1204, information related to the received request for data from the web service is stored as a first modification event. In an embodiment, context modification aggregator 902 is configured to store requests for web service data, such as web service data request 1106, as a modification event similarly to storing information received in an event notification (e.g., event notification 506). For example, web service data request 1106 may include a search query or other textual information, a request to display a location on a map, or any other information related to a request for data from a web service. Such information may be stored by context modification aggregator 902 as a modification event. Context modification aggregator 902 may aggregate information of web service data request 1106 with other context modification information (e.g., received as one or more other event notifications 506), which may be output as aggregated context modification 908. Information of web service data request 1106 and further information included in aggregated context modification 908 may be used by ARM 804 to obtain a second set of advertisements (e.g. second set of advertisements 510) from advertisement server 306 to be provided to web page 302 for display in place of prior display advertisements, as described elsewhere herein.

In step 1206, the request for data is transmitted to the web service. As shown in FIG. 11, web service interface 1104 transmits web service request 1108. Web service interface 1104 may be any type of application programming interface (API) or other remote application interface configured to communicate with a remote application such as web service 1102. Web service interface 1104 may include an API library configured to provide for dynamic in-page access to web service 1102 by web page 302, for example. Web service request 1108 is received and processed by web service 1102. Web service 1102 may be any type of network-based web service or other network based application, including a mapping tool (e.g., Yahoo!® Maps, MapQuest, and Google™ Maps), an image sharing tool (e.g., Yahoo! Flickr™), or any other network-based web service or application. Thousands of examples of web service 1102 exist and will be known to persons skilled in the relevant art(s).

In step 1208, response data is received from the web service. As shown in FIG. 11, web service 1102 generates and transmits a web service response 1110, which is received by web service interface 1104. Web service response 1110 includes response data corresponding to web service request 1108. For example, web service response 1110 may include textual information, generated data, mapping information, images, video, and/or any other relevant data.

In step 1210, the response data is provided to enable display of the web page to be modified based on the response data. As shown in FIG. 11, web service interface 1104 provides web service response data 1112 to web page 302, which includes data received in web service response 1110. After receiving web service response data 1112, content 310 in web page 302 may be modified accordingly (e.g. by web browser 608).

Figure 13:
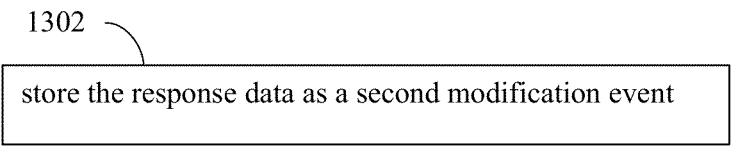
FIG. 13 shows an additional process that may be included in the flowchart of FIG. 12, according to an example embodiment of the present invention.

In the embodiment of FIG. 11, information related to the request received from web page 302 for data from web service 1102 may be included in an aggregated context modification for web page 302. In a further embodiment, the response data received from web service 1102 may additionally or alternatively be included in an aggregated context modification for web page 302. For instance, in an embodiment, flowchart 1200 shown in FIG. 12 may further include a step 1302 shown in FIG. 13. As shown in FIG. 13, in step 1302, the response data is stored as a second modification event. In such an embodiment, web service response data 1112 may also be stored as a modification to the context of web page 302 by context modification aggregator 902. Context modification aggregator 902 may provide the response data to ARM 804 (along with any further aggregated context modification information) upon the occurrence of a trigger event.

Figure 14:
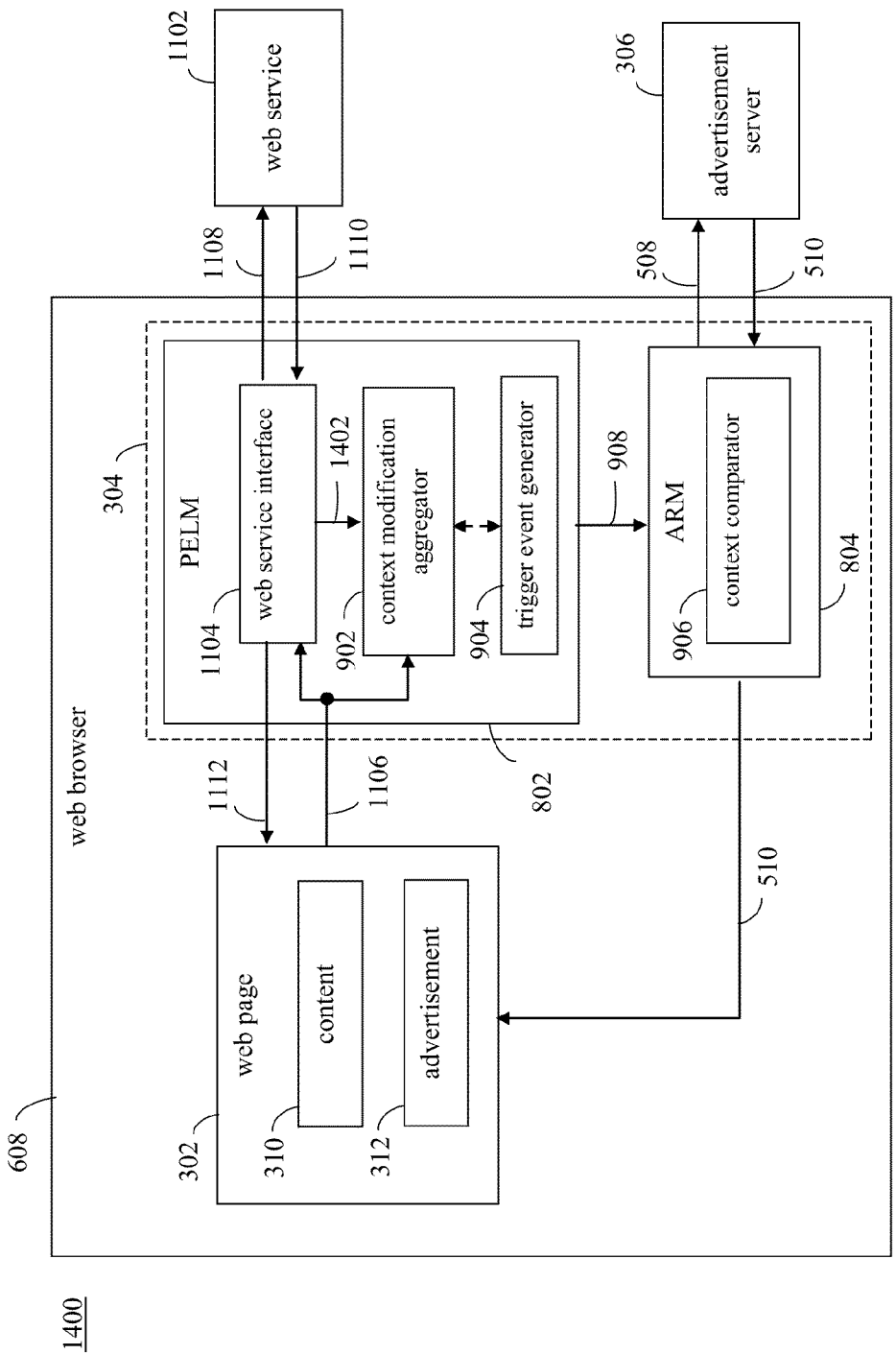
FIG. 14 shows a block diagram of a system for communications between a web browser, a web service, and an advertisement server, according to an example embodiment of the present invention.

For example, FIG. 14 shows a block diagram of a system 1400 for communications between web browser 608, advertisement server 306, and web service 1102, according to another example embodiment of the present invention. System 1400 is generally similar to system 1100 shown in FIG. 11, with differences described as follows. As described above with respect to FIG. 11, web service interface 1104 and context modification aggregator 902 receive web service data request 1106, web service interface 1104 transmits web service request 1108 to web service 1102, and web service interface 1104 receives web service response 1110 from web service 1102. As further shown in FIG. 14, web service interface 1104 may generate web service response information 1402, which may include information received in web service response 1110. Context modification aggregator 902 receives web service response information 1402, and may store information received in web service response information 1402 as a modification event similarly to storing information received in an event notification (e.g., event notification 506). Context modification aggregator 902 may optionally aggregate the information received in web service response information 1402 with other context modification information (e.g., received as one or more event notifications 506), which may be output as aggregated context modification 908 to ARM 804.

Embodiments of the present invention enable the dynamic displaying of advertisements in a web page, without the necessity for reloading the web page. The updating of advertisements may be triggered based on the occurrence of one or more events, which may include interactions by a user with the web page. By enabling the updating of advertisements this manner, a likelihood that a user will click on the advertisements increases, which may enable in an increase in the cost per click (CPC) to be charged by an advertising service. Furthermore, the number of advertisements presented to a user in the web page may be increased, which may enable additional revenue to be generated in the form of the aggregate number of impressions (CPM).

Figure 15:
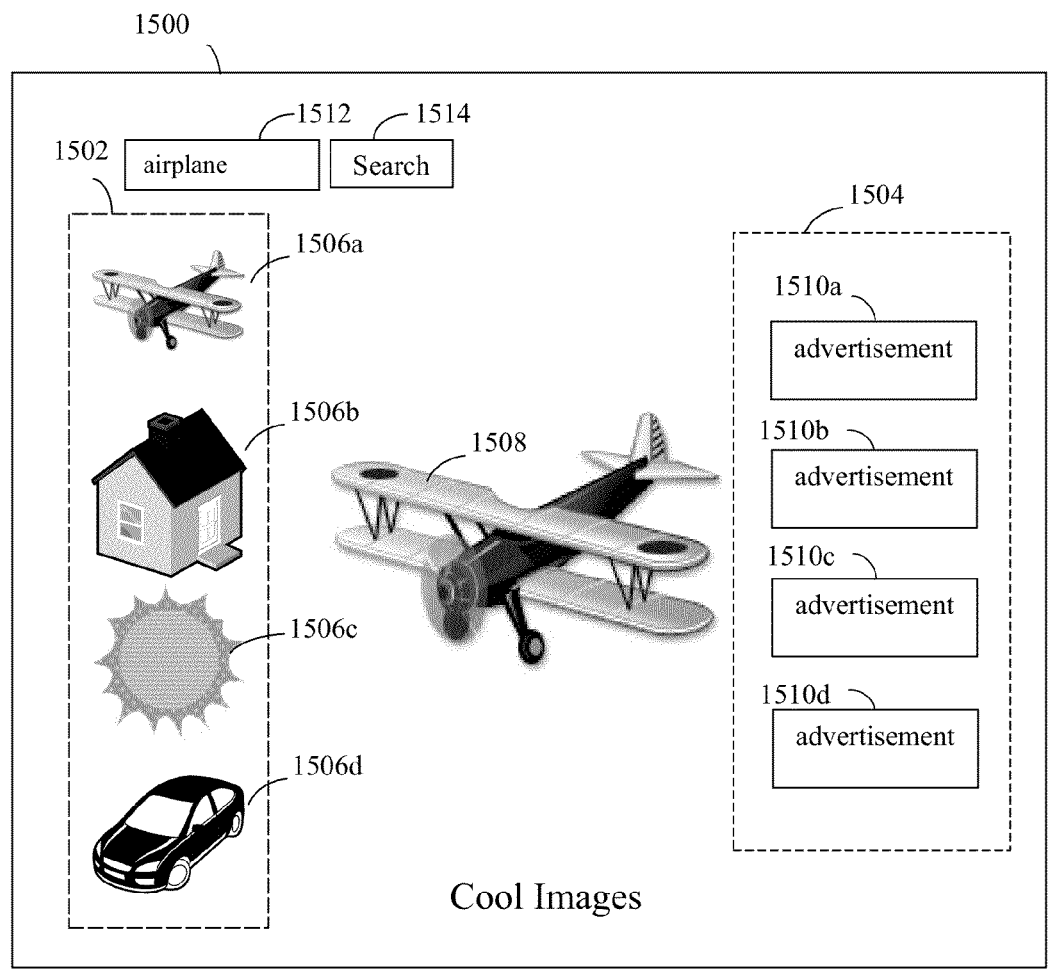
FIGS. 15 and 16 show views of an example dynamic web page, according to embodiments of the present invention.

FIG. 15 shows a web page 1500, which is an example of web page 302, according to an example embodiment. Web page 1500 enables a user (e.g., user 308 shown in FIG. 3) to interact with images, including selecting an image for display in an image library. Furthermore, similarly to webpage 302, advertisements are enabled to be dynamically updated in webpage 1500.

As shown in FIG. 15, web page 1500 includes an image library section 1502, an advertisements section 1504, a selected image 1508, a text entry box 1512, and a search button 1514. Image library section 1502 includes a plurality of images 1506, including first-fourth images 1506a-1506d. Any number of images 1506 may be present in image library section 1502. Advertisements section 1504 includes a plurality of advertisements 1510, including first-fourth advertisements 1510a-1510d. Any number of advertisements 1510 may be present in advertisements section 1504. A user interacting with web page 1500 is enabled to select an image 1506 in image library section 1502 to be displayed as selected image 1508 in a larger form. For example, the user may be enabled to select an image 1506 for display as selected image 1508 by clicking on one of images 1506a-1508d, or by entering a textual description of one of images 1506a-1506d into text entry box 1512 and clicking on search button 1514. In the example of FIG. 15, a user has entered the text "airplane" into text entry box 1512, and has clicked on search button 1514, to cause image 1506a, which is an image of an airplane, to be displayed as selected image 1508.

Web page 1500 is a dynamic web page, such that user interactions with images 1506 that cause display of a selected image 1508 do not cause a reloading of web page 1500. Instead, selected image 1508 is dynamically updated to be a selected one of images 1506a-1506d. In a conventional advertisement providing system, because web page 1500 is not reloaded when a user interacts with images 1506a-1506d, advertisements 1510a-1510d will remain static, despite the change in context of web page 1500. The user interacting with web page 1500 may have indicated an interest in airplanes by selecting image 1506a to be displayed as selected image 1508. However, because advertisements 1510a-1510d are static, replacement advertisements that may be more relevant to the modified context of web page 1500 cannot be obtained to replace one or more of advertisements 1510a-1510d in web page 1500.

According to embodiments, updates to advertisements 1510a-1510d may be triggered based on the occurrence of one or more events, which may include interactions by a user with web page 1500. For example, the user clicking on one of advertisements 1506a-1506d and/or entering text into text entry box 1512 may be considered a modification of context of web page 1500, generating an event notification (e.g., event notification 506). Dynamic advertisement provider 304 shown in FIG. 5 may process the event notification (alone or in combination with one or more other received event notifications) to request a second set of advertisements 510 from advertisement server 306.

Figure 16:
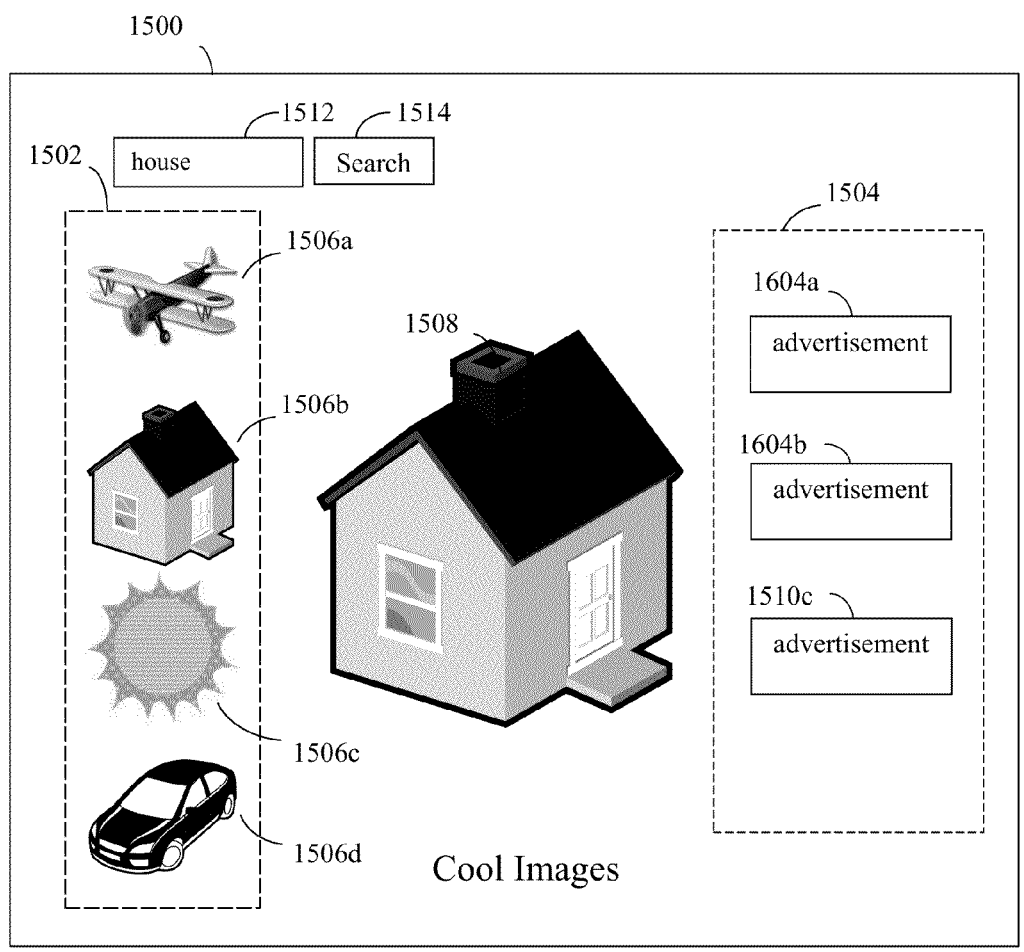

For example, FIG. 16 shows a view of web page 1500 after the user has entered the text "house" in text entry box 1512 and has selected search button 1514. As shown in FIG. 16, second image 1506b is displayed as selected image 1508 because second image 1506b is an image of a house. Referring to the example of dynamic advertisement provider 304 shown in FIG. 9, the text "house" was transmitted to context modification aggregator 902 from web page 1500 as event notification 506. Trigger event determiner 904 may have determined receipt of the text "house" to be a triggering event, or may have determined another triggering event, causing aggregated content modification 908 (which includes the text "house") to be provided to ARM 804. ARM 804 generates a second request 508 for a second set of advertisements based on the modified context of web page 1500, which is transmitted to advertisement server 308. A second set of advertisements 510 is received by ARM 804 based on second request 508, and is provided to web page 1500. For example, referring to FIG. 16, second set of advertisements 510 may include an advertisement 1604a, an advertisement 1604b, and advertisement 1510c. Advertisements 1604a and 1604b are new advertisements that are selected to replace advertisements 1510a, 1510b, and 1510d in web page 1500 based on the modification to the context of web page 1500. For example, advertisements 1604a and 1604b may be advertisements for real estate agents, commercial properties, or other entity user services related to the text "house."

Advertisement 1510c may have maintained relevancy relative to the modification of context to web page 1500, and thus may have been re-provided for display in web page 1500. In one embodiment, advertisement 1510c may have been transmitted to ARM 804 in second set of advertisements 510. Alternatively, ARM 804 may store previously received advertisements (e.g., in a cache or other storage mechanism), such as advertisement 1510c, so that the previously received advertisements do not need to be retransmitted from advertisement server 306 when being provided to web page 1500 for re-display.

Embodiments of the present invention, such as described above with respect to web page 1500, enable users to interact with dynamic web pages, while providing the users with an increased number of advertisements and/or more relevant advertisements. Examples of such dynamic web pages include those provided by image viewing applications (e.g., Yahoo! Flickr™), audio applications, video applications (e.g., YouTube™), mapping tools (e.g., Yahoo!® Maps, MapQuest, and Google™ Maps), or any other network-based web service or application. Thousands of examples of such web-based applications exist and will be known to persons skilled in the relevant art(s).

In one example, web page 302 may include a "mashup" as content. A mashup is a web application that combines data from more than one source into an integrated tool. In one example, web page 302 may provide access to a mashup of a mapping tool and Yahoo!® Local. The mapping tool may display a map of a location on web page 302, and Yahoo!® Local may be used to display information regarding the displayed location, including restaurants, businesses, parks, etc. The information may be displayed in the map or adjacent to the map (e.g., in the form of text or images). A user interacting with this mashup at web page 302 may pan around in the map to display various locations, which may generate events notifications. Furthermore, the user may interact with displayed information regarding a location including the restaurants, businesses, parks, and other features displayed in the map, which may also generate even notifications. As described elsewhere herein, these event notifications may be used to provide in-page updates to advertisements displayed in web page 302.

Example Computer System Implementations

As described above, dynamic advertisement provider 304 may include hardware, software, firmware, or any combination thereof to perform at least a portion of its functions. For example, any one or more of dynamic advertisement provider 304, PELM 802, ARM 804, web browser 608, web service interface 1104, context modification aggregator 902, trigger event generator 904, and/or context comparator 906 (shown in FIGS. 3, 5-9, 11, and 14) may include computer code configured to be executed in one or more processors. Alternatively or additionally, any one or more of dynamic advertisement provider 304, PELM 802, ARM 804, web browser 608, web service interface 1104, context modification aggregator 902, trigger event generator 904, and/or context comparator 906 may include hardware logic/electrical circuitry.

In an embodiment, dynamic advertisement provider 304, PELM 802, ARM 804, web browser 608, web service interface 1104, context modification aggregator 902, trigger event generator 904, and/or context comparator 906 may implemented in one or more computers, including a personal computer, a mobile computer (e.g., a laptop computer, a notebook computer, a handheld computer such as a personal digital assistant (PDA) or a Palm™ device, etc.), or a workstation. These example devices are provided herein purposes of illustration, and are not intended to be limiting. Embodiments of the present invention may be implemented in further types of devices, as would be known to persons skilled in the relevant art(s).

Devices in which embodiments may be implemented may include storage, such as storage drives, memory devices, and further types of computer-readable media. Examples of such computer-readable media include a hard disk, a removable magnetic disk, a removable optical disk, flash memory cards, digital video disks, random access memories (RAMs), read only memories (ROM), and the like. As used herein, the terms "computer program medium" and "computer-readable medium" are used to generally refer to the hard disk associated with a hard disk drive, a removable magnetic disk, a removable optical disk (e.g., CDROMs, DVDs, etc.), zip disks, tapes, magnetic storage devices, MEMS (micro-electromechanical systems) storage, nanotechnology-based storage devices, as well as other media such as flash memory cards, digital video discs, RAM devices, ROM devices, and the like. Such computer-readable media may store program modules that include logic for implementing dynamic advertisement provider 304, PELM 802, ARM 804, web browser 608, web service interface 1104, context modification aggregator 902, trigger event generator 904, and/or context comparator 906, flowchart 400 of FIG. 4, flowchart 1000 of FIG. 10, flowchart 1200 of FIG. 12, step 1302 of FIG. 13, and/or further embodiments of the present invention described herein. Embodiments of the invention are directed to computer program products comprising such logic (e.g., in the form of program code or software) stored on any computer useable medium. Such program code, when executed in a processing unit (that includes one or more data processing devices), causes a device to operate as described herein.

Example Embodiments

In an embodiment, a method for providing advertisements in a web page includes receiving a first set of one or more advertisements for display on a web page, providing the first set of one or more advertisements to be displayed on the web page, receiving at least one event notification indicating a modification to a context of the web page, generating a second request for one or more advertisements for display on the web page based on the at least one event notification, receiving a second set of one or more advertisements, and providing the second set of one or more advertisements to be displayed on the web page in place of at least one advertisement of the first set.

The receiving of at least one event notification indicating a modification to a context of the web page may include receiving a plurality of event notifications indicating a plurality of modifications to the context of the web page, and aggregating the plurality of modifications to the context of the web page indicated by the plurality of event notifications to generate an aggregated modification to the context of the web page.

The generating a second request for one or more advertisements for display on the web page based on the at least one event notification may include generating the second request when the aggregated modification reaches a predetermined threshold.

The generating a second request for one or more advertisements for display on the web page based on the at least one event notification may also include generating the second request due to receiving an event notification corresponding to a trigger event.

The receiving at least one event notification indicating a modification to a context of the web page may include receiving a request from the web page for data from a web service, and storing information related to the received request for data from the web service as a first event notification.

The receiving at least one event notification indicating a modification to a context of the web page may also include transmitting the request for data to the web service, receiving response data from the web service, and storing the response data as a second event notification.

The method may further include transmitting the request for data to the web service, receiving response data from the web service, and providing the response data to enable display of the web page to be modified based on the response data.

In yet another embodiment, a system for providing advertisements in a web page may include an advertisement request module (ARM) and a page event listener module (PELM). The ARM may be configured to generate a first request for one or more advertisements for display on a web page, to receive a first set of one or more advertisements based on the first request, and to provide the first set of one or more advertisements to be displayed on the web page. The PELM may be configured to receive at least one event notification indicating a modification to a context of the web page, and to provide the received at least one event notification to the ARM. The ARM may also be configured to generate a second request for one or more advertisements for display on the web page based on the at least one event notification, to receive a second set of one or more advertisements based on the second request, and to provide the second set of one or more advertisements to be displayed on the web page in place of at least one advertisement of the first set.

The PELM may include a context modification aggregator configured to receive a plurality of event notifications indicating a plurality of modifications to the context of the web page, and to aggregate the plurality of modifications to the context of the web page indicated by the plurality of event notifications to generate an aggregated modification to the context of the web page.

The ARM may also be configured to determine whether the aggregated modification has reached a predetermined threshold, and if the aggregated modification is determined to have reached the predetermined threshold, to generate the second request.

The PELM may also include a trigger event generator configured to determine whether a received event notification corresponds to a trigger event. The ARM may be configured to generate the second request if the received event notification is determined to correspond to a trigger event.

The PELM may also be configured to receive a request from the web page for data from a web service. The context modification aggregator may be configured to store information related to the received request for data from the web service as a first event notification.

The PELM may also be configured to transmit the request for data to the web service and to receive response data from the web service. The context modification aggregator may be configured to store the response data as a second event notification.

The system may further include a web service interface configured to transmit the request for data to the web service, to receive response data from the web service, and to provide the response data to enable display of the web page to be modified based on the response data.

In yet another embodiment, a method for dynamically updating a web page includes receiving at least one event notification indicating a modification to a context of a web page that displays one or more advertisements, determining a received event notification that corresponds to a trigger event, and providing the at least one event notification to enable one or more advertisements to be obtained and displayed on the web page in place of at least one advertisement of the first set.

The receiving an at least one event notification indicating a modification to a context of a web page that displays one or more advertisements may include receiving a request from the web page for data from a web service and storing information related to the received request for data from the web service as a first event notification.

The receiving at least one event notification indicating a modification to a context of a web page that displays one or more advertisements may also include transmitting the request for data to the web service, receiving response data from the web service, and storing the response data as a second event notification.

In yet another embodiment, system for dynamically updating a web page includes a context modification aggregator and a trigger event determiner. The context modification aggregator may be configured to receive at least one event notification indicating a modification to a context of a web page that displays one or more advertisements. The trigger event determiner may be configured to determine whether a received event notification corresponds to a trigger event. The context modification aggregator may be further configured to provide the at least one event notification if a received event notification is determined by the trigger event determiner to correspond to a trigger event, to enable one or more advertisements to be obtained and displayed on the web page in place of at least one advertisement of the first set.

The context modification aggregator may be configured to receive a request from the web page for data from a web service, and to store information related to the received request for data from the web service as a first event notification.

The system may further include a web service interface configured to transmit the request for data to the web service and to receive response data from the web service. The context modification aggregator may be configured to store the response data as a second event notification.

CONCLUSION

While various embodiments of the present invention have been described above, it should be understood that they have been presented by way of example only, and not limitation. It will be apparent to persons skilled in the relevant art(s) that various changes in form and details may be made to the embodiments described above without departing from the spirit and scope of the invention as defined in the appended claims. Accordingly, the breadth and scope of the present invention should not be limited by any of the above-described exemplary embodiments, but should be defined only in accordance with the following claims and their equivalents.

What is claimed is:

1. A system for displaying advertisements in a dynamic web page, comprising:
a computer system comprising one or more memories storing data executable by a processor, and one or more processors configured to execute the stored data to:
display a first set of one or more advertisements on the dynamic web page loaded using a web browser; and
display a second set of one or more advertisements on the dynamic web page at least partially in place of at least one advertisement of the first set of the one or more advertisements in response to a modification of a context of the dynamic web page, the modified context being independent of the displayed first set of one or more advertisements, the modification of the context of the dynamic web page and the display of the second set of one or more advertisements not causing the dynamic web page to be reloaded.

2. The system of claim 1, wherein the one or more processors are further configured to execute the stored data to:
modify content of the dynamic web page in response to an interaction with the dynamic web page by a user, the interaction causing the modification of the context of the dynamic web page.

3. The system of claim 2, wherein the interaction comprises at least one of the user moving a mouse pointer over designated content of the dynamic web page and the user clicking on the designated content of the dynamic web page, the one or more processors are further configured to execute the stored data to:
cause at least one of text and graphics to be displayed in the dynamic web page in response the interaction.

4. The system of claim 2, wherein the interaction comprises a user typing text into an entry box in the dynamic web page.

5. The system of claim 1, wherein the one or more processors are further configured to execute the stored data to:
modify content of the dynamic web page in response to a code of the dynamic web page causing modification to the content of the dynamic web page, the interaction causing the modification of the context of the dynamic web page.

6. The system of claim 1, wherein the one or more processors are further configured to execute the stored data to:
transmit at least one event notification indicating the modification of the context of the dynamic web page.

7. A method for selecting advertisements to be displayed in a dynamic web page, comprising:
receiving by an advertisement server a first request to provide one or more advertisements for display on the dynamic web page, the first request including information regarding a context of the dynamic web page;
selecting by the advertisement server a first set of one or more advertisements from a plurality of advertisements based on the information regarding the context of the dynamic web page included in the first request;
receiving by the advertisement server a second request for one or more advertisements, the second request including information regarding a modification of the context of the dynamic web page, the modified context being independent from the displayed first set of one or more advertisements; and
selecting by the advertisement server a second set of one or more advertisements from the plurality of advertisements based on the information regarding the modification of the context of the dynamic web page included in the second request, wherein the second set of the one or more advertisements is at least in part to be displayed in the dynamic web page in place of at least one advertisement of the first set of the one or more advertisements.

8. The method of claim 7, wherein the context of the dynamic web page is based on one or more of:
a content of the dynamic web page;
attributes of a user causing the dynamic web page to be displayed; and
attributes of an electronic device being used to display the dynamic web page.

9. The method of claim 7, wherein the modification of the context of the dynamic web page is caused by a user interacting with a content of the dynamic web page.

10. The method of claim 9, wherein the modification of the context caused by the user interacting with the content of the dynamic web page includes:
causing at least one of text and graphics to be displayed in the dynamic web page in response to at least one of moving a mouse pointer over a designated content of the dynamic web page and clicking on the designated content of the dynamic web page.

11. The method of claim 9, wherein the modification of the context caused by the user interacting with the content of the dynamic web page comprises:
typing a text into an entry box in the dynamic web page.

12. The method of claim 7, wherein the second request is generated upon an occurrence of a predetermined number of modifications to the context of the dynamic web page.

13. A method for providing advertisements in a dynamic web page, comprising:
providing, via a computing device, a first set of one or more advertisements to be displayed on a dynamic web page loaded using a web browser;
receiving, at the computing device, an indication of a modification to a context of the dynamic web page, the modification to the context of the dynamic web page and the display of the second set of one or more advertisements not causing the dynamic web page to be reloaded, the modified context being independent from the displayed first set of one or more advertisements; and
providing, via the computing device, a second set of one or more alternative advertisements to be displayed on the dynamic web page at least partially in place of at least one advertisement of the first set of the one or more advertisements in response to the modification to the context of the dynamic web page.

14. The method of claim 13, wherein said receiving comprises:
receiving a plurality of event notifications indicating a plurality of modifications to the context of the dynamic web page; and
aggregating the plurality of modifications to the context of the dynamic web page indicated by the plurality of event notifications to generate an aggregated modification to the context of the dynamic web page.

15. The method of claim 14, wherein said providing a second set of one or more alternative advertisements to be displayed on the dynamic web page in place of at least one advertisement of the first set of the one or more advertisements in response to the modification to the context of the dynamic web page comprises:

provide the second set of one or more alternative advertisements to be displayed on the dynamic web page at least partially in place of at least one advertisement of the set of one or more advertisements in response to the aggregated modification reaching a predetermined threshold.

16. The method of claim 13, wherein said receiving comprises:

receiving an event notification corresponding to a trigger event; and wherein said providing a second set of one or more alternative advertisements to be displayed on the dynamic web page in place of at least one advertisement of the first set of the one or more advertisements in response to the modification to the context of the dynamic web page comprises:

providing the second set of one or more alternative advertisements to be displayed on the dynamic web page at least partially in place of at least one advertisement of the set of one or more advertisements in response to receiving the event notification corresponding to the trigger event.

17. The method of claim 13, wherein said receiving comprises:

receiving at least one event notification indicating the modification to the context of the dynamic web page; and wherein said providing a second set of one or more alternative advertisements to be displayed on the dynamic web page at least partially in place of at least one advertisement of the first set of the one or more advertisements in response to the modification to the context of the dynamic web page comprises:

providing the second set of one or more alternative advertisements to be displayed on the dynamic web page at least partially in place of at least one advertisement of the set of one or more advertisements in response to receiving the at least one event notification.

18. The method of claim 17, wherein said receiving at least one event notification indicating the modification to the context of the dynamic web page comprises:

receiving a request from the dynamic web page for data from a web service; and storing information related to the received request for the data from the web service as a first event notification.

19. The method of claim 18, wherein said receiving at least one event notification indicating the modification to the context of the dynamic web page further comprises:

transmitting the request for data to the web service;

receiving response data from the web service; and storing the response data as a second event notification.

20. The method of claim 18, further comprising:

transmitting the request for data to the web service; receiving response data from the web service; and providing the response data to enable display of the dynamic web page to be modified based on the response data.

* * * * *